United States Patent Office 2,977,117
Patented Mar. 28, 1961

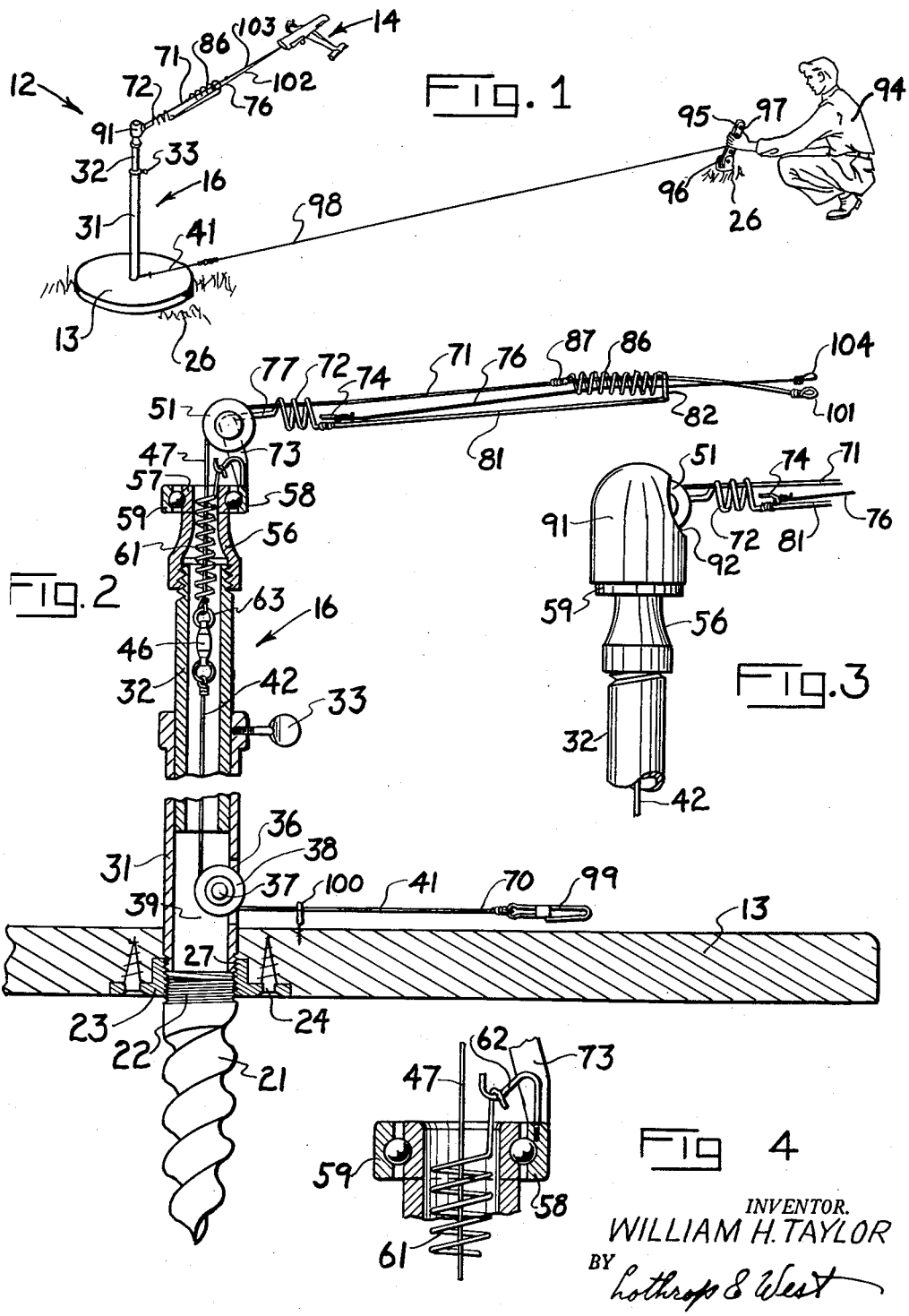

2,977,117

CONTROL FOR MODEL AIRCRAFT

William H. Taylor, 2418 Watson St., Sacramento 21, Calif.

Filed July 31, 1957, Ser. No. 675,448

3 Claims. (Cl. 272—31)

The invention relates to devices for controlling the flight of tethered model aircraft and, more particularly to devices enabling the user to control the aircraft from a location outside the flight circle.

It has long been recognized that model aircraft control from the center of the flight circle leaves much to be desired, for it is necessary, in such case, that the operator turn with the aircraft as it revolves. This procedure is not only unrealistic since it is but little like actual control of an airplane, but it often results in the operator's becoming dizzy.

It is therefore an object of the invention to provide a model aircraft control which renders it unnecessary for the operator to turn around with the plane.

It is another object of the invention to provide a device in which the aircraft can be controlled from a location remote from the center of the flight circle, control being effected by a lever, or stick, thus resembling in many aspects the control procedures of a full-size airplane.

It is yet another object of the invention to provide a control device whose operation is smooth and effortless and which thus leads to a realistic sense of flight as well as serving as a good test of the operator's skill.

It is yet a further object of the invention to provide a tethered model aircraft control device which can readily be assembled and as readily disassembled so as to occupy but a small amount of space when being carried.

It is another object of the invention to provide a control device which, while being relatively economical, is rugged and durable and which requires but a minimum of maintenance expense.

It is yet another object of the invention to provide an aircraft control device which can rigidly be affixed to the ground.

It is still another object of the invention to provide a device enabling the operator to control not only the aircraft's take-off and flight maneuvers but the landing as well.

It is a yet further object of the invention to provide a generally improved tethered model aircraft control.

Other objects, together with the foregoing, are attained in the embodiment described in the following description and shown in the accompanying drawing in which:

Figure 1 is a perspective of the control device in a characteristic environment with the aircraft in flight and the operator maneuvering the aircraft from a location outside the flight circle;

Figure 2 is a median vertical section, a portion of the structure being broken away to reduce the extent of the figure;

Figure 3 is a side elevation of the pylon rotating head with the protective cap installed; and Figure 4 is a section, to an enlarged scale, of the rotating head members.

While the control device of the invention is susceptible of numerous physical embodiments, depending on the environment and requirements of use, considerable numbers of the herein shown and described embodiment have been made and used and have performed in an eminently satisfactory manner.

The control device, generally characterized by the numeral 12, comprises a circular base plate 13 having a diameter adequate to resist any over-turning moment exerted by the model aircraft 14 as it proceeds in its circular flight path around a pylon 16 mounted vertically in the base.

Rigidity of the base plate 13 is materially augmented by an auger bit 21 threaded adjacent its shank portion 22 for engagement with the internal threads in a flange member 23 secured to the base plate by appropriate fastenings 24, the flange being disposed in a conforming recess in the base plate so that the bottom of the flange is flush with the bottom of the plate. While being transported to and from the flight area, the bit 21 is disengaged from the flange; in use, however, the auger is mounted on the flange and the base plate is rotated while being pressed downwardly, the auger boring into the ground 26 until the base plate is firmly affixed thereto.

Likewise capable of being disassembled from the base plate and the flange 23 is the pylon 16, suitable threads 27 on the bottom end of the pylon being engageable with the flange threads.

The desirability of saving space is further enhanced by making the pylon 16 capable of being telescoped. Consequently, the lower pylon member 31 is made with a diameter sufficient to accommodate the upper member 32, a thumb-screw 23 permitting the user readily to lock or unlock the two members.

Adjacent the bottom of the pylon a vertical slot 36 is provided. Within the slot 36 and rotatably mounted on a cross-pin 37 appropriately secured to the adjacent slot walls is a lower pulley 38. The innermost portion of the pulley groove is substantially tangent to the vertical axis 39 of the hollow pylon so that as the control cable 41 is reeved about the lower pulley, the upward run 42 of the control cable 41 is substantially vertical, or coincident with the pylon axis 39.

In order that rotation of the upper end of the control cable can freely take place while maintaining tension on the cable a small anti-friction bearing swivel 46 is interposed in the control cable. Thus, as the portion 47 of the control cable which is reeved about an upper pulley 51 is rotated, the lower portion of the control cable is not unwound.

In threaded engagement with the upper pylon member 32 is an adapter section 56 having secured, in coaxial fashion thereto, the inner race 57 of an anti-friction bearing 58. The upper pulley 51 is mounted in suitable fashion to the outer race 59 of the bearing 58, so that the upper pulley 51 is free to revolve about the vertical pylon axis 39.

Serving partly as a guide for the cable run 47 and partly as a tensioning member is a helical spring 61 hooked at its upper end to a loop 62 mounted on the outer bearing race 59 and at its lower end to the upper eye 63 of the swivel 46. With this construction it can be seen that an upward tension is at all times maintained on the lower run of the control cable 41, thus preventing the portion of the cable reeved over the lower pulley 38 from becoming unreeved. In other words, the spring tends to maintain a continuous tension in an upward direction on the vertical cable run 42 and in an inward direction on the lower exterior portion 70 of the cable 41.

The upper exterior portion 71 of the control cable departs tangentially from the upper pulley 51 and extends through the center of a helical spring 72, the inner end of the spring 72 being mounted on one side of the post 73, or yoke, which also supports the pulley 51. The outer or distal end of the spring 72 is recurved to form a hook 74 to which the tether cable 76 is attached. The shank portion 77 of the spring 72 is rather flexible so that as the control cable portion 71 and the tether cable 76 rotate in response to the revolutions of the aircraft 14, the pulley 51, the yoke 73 and the outer race 59 are correspondingly swung around in a smooth fashion. That is to say, the spring serves to cushion or smooth out any slight erratic motions impressed on it by the cables. Likewise, as the elevation of the aircraft changes, the spring 72 is bent upwardly or downwardly about the flexible shank 77, the helix at all times pointing substantially toward the aircraft so that the cables are maintained in accurate and substantially linear alignment.

Mounted on the hook 74 and extending outwardly therefrom is a spar 81 terminating in a loop 82 substantially coaxial with the axis of the helical spring 72, and assisting in maintaining proper alignment of the cables disposed in the loop 82.

Projecting inwardly from the loop 82 is a rather light or weak tension spring 86 also serving to guide the cables but, in the main, acting as a tension member. The control cable portion 71 is affixed to the inner end 87 of the spring 86 and, as a consequence a continuous tension on the control cable run 71 is maintained, thus preventing the control cable from jumping the groove in the upper pulley 51 where, for example the tension on the vertical runs 42 and 47 of the control cable is suddenly removed.

Providing a streamlined appearance as well as largely protecting the covered elements from dust, grit and rain is a dome 91, or cap, adapted to be fitted over and frictionally secured to the outer bearing race, an appropriate slot and opening 92 in the dome enabling the cap to be inserted in place with the pulley 51 and attendant outboard members being free to operate, as appears most clearly in Figure 3.

Unlike the majority, at least, of prior devices control is remotely exercised by an operator 94 located outside the flight circle, the operator manipulating a lever 95 pivotally mounted between a pair of ears 96 appropriately affixed to the ground 26. A plurality of apertures 97 in the lever enables the operator to relocate the outer end of the control cable at different positions on the lever and thus to alter the leverages on and extent of movement of the control cable.

As the lever is moved in a clockwise direction, or toward the right, as appears in Figure 1, the control cable extension 98, attached to the control cable run 41 by a snap-hook 99 is correspondingly urged in a right hand direction. In order that the cable run 41 be kept tangent to the lower pulley 38 a screw eye 100 mounted on the base plate is utilized to guide the cable run 41. Preferably, some care should also be used in establishing the location of the lever 97 mechanism; that is to say, after the base plate and pylon are firmly secured to the ground, the lever mechanism should be so oriented that the cable extension 98 and the cable run 41 are in alignment with the screw eye 100 and the lowermost groove portion of the lower pulley 38. Binding is thereby prevented.

As the lever exerts a pull on the control cable, the tension is transmitted to the cable run 71, thence through the cable eye 101, to the upper cable extension 102 and to the aircraft.

No description of the aircraft control mechanism is deemed necessary since they are conventional and ordinarily comprise a bell crank pivoted centrally, one arm of the bell crank being affixed to the control cable extension 102 and the other arm to the tether cable extension 103, which is secured to the tether cable run 76 at an eye 104.

As the plane revolves in steady flight the tensions on the control cable and the tether cable are substantially equal, centrifugal force exerting a substantially identical tension on both cables.

Should the operator desire to make the aircraft climb, the lever 95 is pulled toward him, a tension being thereby impressed on the control cable in excess of the opposed force on the cable resulting from centrifugal force. As a consequence, the outward tension caused by centrifugal force is overcome and the control cable is, in effect, pulled inwardly, thus rotating the bell crank. By the action of suitable rods leading from the bell crank to the elevator surfaces, the aircraft is caused to head upwardly. When the desired elevation is reached the lever movement is halted. At this juncture, the centrifugal force exerted by the aircraft again brings the cable tensions back to equilibrium, the tensions, in other words, are again equalized and the bell-crank is returned to neutral position for level flight.

When it is desired to lower the plane's altitude, the lever is pushed forwardly, thereby releasing the tension on the control cable and permitting the strong spring 61 quickly to take up any slack in the cable. In comparable fashion, the spring 86 takes up any slack in the cable runs 47 and 71. The pre-existing equal tensions on the two cables are thus unequalized by moving the lever forwardly, and the bell crank is rotated accordingly by the stronger or differential tension exerted by the tether cable the aircraft's elevator being thereby inclined so as to reduce its elevation.

It is of course to be recognized that throughout the operation of the device the swivel 46 isolates the upper control cable against the rotational restraint exerted by the non-rotating lower cable portions yet transmits all tensional forces from one control cable portion to the other. Likewise, the outer bearing race and its attendant structures are isolated from the stationary pylon. Consequently, the aircraft is free to revolve in its flight path and is retarded only by the minute frictional forces exerted by the bearing 58 and the swivel 46.

A highly realistic operation is thereby achieved, the operator manipulating the lever so as to simulate the movements of the "joy-stick" of a full-size airplane. Take-offs and landings are possible since the cable extension 98 is usually placed low enough to the ground as not to interfere with the aircraft's wheels, should it be necessary for the wheels to pass over the cable.

What I claim is:

1. A control for model aircraft comprising a hollow vertical pylon, an anti-friction bearing mounted coaxially on the upper end of said pylon, a lower pulley rotatably mountd on said pylon, an upper pulley rotatably mounted on the outer race of said bearing, a helical tension spring mounted on said upper pulley and extending toward a model aircraft, a tether cable having one end secured to said spring and the other end secured to the model aircraft, an extension rod mounted on said spring and projecting away therefrom in parallel relation to the axis of said spring, an outer resilient member mounted on the distal end of said rod and extending inwardly toward said spring in substantially coaxial alignment therewith, an inner resilient member mounted on said outer race of said bearing and extending downwardly into said pylon, a control lever rockably mounted on the ground at a location remote from said pylon, a control cable attached at one end to said control lever and at the other end to the model aircraft, the intermediate portion of said control cable being reeved over said pulleys, said control cable being attached to the inner end of said outer resilient member, and a swivel interposed in said control cable intermediate said inner resilient member and said lower pulley, the lower end of said inner resilient member being affixed to the upper portion of said swivel for rotation therewith.

2. The device of claim 1 wherein said outer and said inner member each is a helical spring, said control cable being disposed within said springs whereby said control cable is guided.

3. A control for a model aircraft comprising a hollow vertical pylon, a bearing mounted coaxially with said pylon at the upper end thereof, a first pulley rotatably mounted adjacent the lower end of said pylon, a second pulley rotatably mounted on the rotatable portion of said bearing, the axis of said pylon being substantially tangent to said pulleys, a control cable reeved over said pulleys one end of said control cable leading to a model aircraft, a control lever secured to the other end of said control cable, a swivel interposed in said control cable between said first pulley and said second pulley, means interposed between said swivel and said second pulley for urging said swivel in an upward direction, a rod mounted on said second pulley and extending toward the model aircraft, a tether cable mounted at one end on said rod and secured at the other end to the model aircraft, and resilient means mounted at one end on said rod and secured at the other end to said control cable outboard of said second pulley for urging said control cable adjacent said rod in an outward direction.

References Cited in the file of this patent

UNITED STATES PATENTS

| | | |
|---|---|---|
| 2,323,506 | Willard | July 6, 1943 |
| 2,390,307 | Kelecius | Dec. 4, 1945 |
| 2,432,119 | Nash et al. | Dec. 9, 1947 |
| 2,478,351 | Wood | Aug. 9, 1949 |
| 2,538,132 | Taggert | Jan. 16, 1951 |
| 2,603,910 | Jones | July 22, 1952 |
| 2,650,827 | Hamilton | Sept. 1, 1953 |
| 2,825,562 | Clarkson | Mar. 4, 1958 |

FOREIGN PATENTS

| | | |
|---|---|---|
| 444,964 | Italy | Feb. 3, 1949 |